(12) United States Patent
Han

(10) Patent No.: US 10,396,635 B2
(45) Date of Patent: Aug. 27, 2019

(54) REFLECTIVE OPTICAL ENCODER WITH CONTAMINANT PROTECTION

(71) Applicant: OTIS ELEVATOR COMPANY, Farmington, CT (US)

(72) Inventor: HakKi Han, Seoul (KR)

(73) Assignee: OTIS ELEVATOR COMPANY, Farmington, CT (US)

( * ) Notice: Subject to any disclaimer, the term of this patent is extended or adjusted under 35 U.S.C. 154(b) by 21 days.

(21) Appl. No.: 15/746,554

(22) PCT Filed: Aug. 24, 2016

(86) PCT No.: PCT/US2016/048340
§ 371 (c)(1),
(2) Date: Jan. 22, 2018

(87) PCT Pub. No.: WO2017/040136
PCT Pub. Date: Mar. 9, 2017

(65) Prior Publication Data
US 2018/0212495 A1 Jul. 26, 2018

Related U.S. Application Data

(60) Provisional application No. 62/211,974, filed on Aug. 31, 2015, provisional application No. 62/335,143, filed on May 12, 2016.

(51) Int. Cl.
*B66B 1/34* (2006.01)
*B66B 1/36* (2006.01)
(Continued)

(52) U.S. Cl.
CPC ............ *H02K 11/22* (2016.01); *B66B 1/3492* (2013.01); *G01D 5/34738* (2013.01); *H02K 5/10* (2013.01);
(Continued)

(58) Field of Classification Search
CPC ...... H02P 1/00; H02P 1/40; H02P 1/42; H02P 1/24; H02P 3/00; H02P 3/04; H02P 3/16;
(Continued)

(56) References Cited

U.S. PATENT DOCUMENTS 3,773,146 A * 11/1973 Dixon, Jr. ............. B66B 1/3492
187/394
5,762,510 A  6/1998 Taniguchi et al.
(Continued)

FOREIGN PATENT DOCUMENTS

CN    1387300 A    12/2002
CN    1464623 A    12/2003
(Continued)

OTHER PUBLICATIONS

International Search Report and Written Opinion of the International Searching Authority for International application No. PCT/US2016/048340 dated Dec. 16, 2016.
(Continued)

*Primary Examiner* — Antony M Paul
(74) *Attorney, Agent, or Firm* — Carlson, Gaskey & Olds

(57) ABSTRACT

A reflective optical encoder (40) assembly includes a motor and brake assembly at least partially in a motor and brake housing (42). An encoder housing is at least partially received in a cavity (34) of the motor and brake housing. The reflective optical encoder includes an encoder disk (50) and an encoder shaft (44) that rotate with a shaft of the motor. The assembly includes holes (54, 56, 58) in the encoder disk. A seal (80) at an interface between the encoder housing and the encoder shaft to prevent contaminants from the cavity from entering the encoder housing and a packing inside the encoder housing. A packing (84) is situated to prevent any dust or debris associated with the encoder shaft rotating relative to the seal from getting on the encoder disk.

21 Claims, 3 Drawing Sheets

(51) Int. Cl.
*H02K 5/10* (2006.01)
*B66B 11/04* (2006.01)
*G01D 5/347* (2006.01)
*H02K 11/22* (2016.01)
*H02K 7/102* (2006.01)

(52) U.S. Cl.
CPC .............. *H02K 7/102* (2013.01); *B66B 1/36* (2013.01); *B66B 11/043* (2013.01)

(58) Field of Classification Search
CPC ...... H02P 3/26; H02P 6/00; H02P 6/04; H02P 3/18; H02P 21/00; H02P 29/04; H02P 23/00; H02P 27/00; H02P 27/06; H02P 3/14; H02K 7/10; H02K 17/32; H02K 23/68; H02K 27/30; G05B 19/29
USPC .... 318/602, 400.4, 741, 757, 759, 258, 261, 318/269, 273, 362, 372, 375, 376; 188/4 B, 18 A, 24.14, 24.18, 24.19, 73.1, 188/71.1, 72.1, 72.3, 271, 272, 140 A, 188/361, 363, 365, 366, 369, 206 R; 187/240, 245, 391; 340/11.1
See application file for complete search history.

(56) References Cited

U.S. PATENT DOCUMENTS

| | | | |
|---|---|---|---|
| 8,497,468 B2 | 7/2013 | Setbacken et al. | |
| 8,933,392 B2 | 1/2015 | Harada | |
| 9,093,937 B2* | 7/2015 | Backman | H02P 6/16 |
| 9,104,650 B2* | 8/2015 | Hosek | G06F 11/2257 |
| 9,134,142 B2 | 9/2015 | Kirk et al. | |
| 2002/0145108 A1 | 10/2002 | Rodi | |
| 2014/0367559 A1* | 12/2014 | Yoshizawa | G01D 5/3473 250/231.1 |
| 2015/0053040 A1 | 2/2015 | Ueda et al. | |
| 2016/0056691 A1 | 2/2016 | Hale | |

FOREIGN PATENT DOCUMENTS

| | | |
|---|---|---|
| CN | 2745902 Y | 12/2005 |
| CN | 1812927 A | 8/2006 |
| CN | 201136727 Y | 10/2008 |
| CN | 201956866 U | 8/2011 |
| CN | 10226702 | 10/2011 |
| CN | 202195061 U | 4/2012 |
| CN | 102730523 A | 10/2012 |
| CN | 202696386 U | 1/2013 |
| CN | 203490237 U | 3/2014 |
| CN | 204013158 U | 12/2014 |
| CN | 204013159 U | 12/2014 |
| CN | 204391959 U | 6/2015 |
| CN | 204633506 U | 9/2015 |
| JP | H02176416 A | 7/1990 |
| JP | H04110919 U | 9/1992 |
| JP | H07255148 | 10/1995 |
| JP | H09322463 | 12/1997 |
| JP | 2009-008457 A | 1/2009 |
| WO | WO2015195526 | 12/2015 |

OTHER PUBLICATIONS

International Preliminary Report on Patentability for International application No. PCT/US2016/048340 dated Mar. 15, 2018.

* cited by examiner

REFLECTIVE OPTICAL ENCODER WITH CONTAMINANT PROTECTION

BACKGROUND

Optical encoders provide feedback regarding relative movement of, for example, a motor shaft. Elevator systems employ electric motors to move an elevator car along a hoistway between floors. There are various aspects of elevator system operation that utilize information regarding the position of the elevator car and a speed of elevator car movement. The information available from an optical encoder associated with the motor can be used to track elevator car position and movement.

There are various challenges associated with using optical encoder in elevator systems. For example, the motor and associated electronics in an elevator system without a machine room are exposed to the conditions in the hoistway. Different locations and hoistway or building configurations introduce additional potential issues or difficulties that interfere with consistent or reliable encoder operation. It follows that enhancements to encoder arrangements are needed.

SUMMARY

An illustrative example embodiment of an optical encoder and motor assembly includes: a motor and brake device, the motor and brake device including a motor shaft that rotates or remains stationary based on operation of the motor and brake device; a motor and brake housing at least partially enclosing the motor and brake device, the motor and brake housing including at least one cavity aligned with the motor shaft; an encoder housing at least partially received in the at least one cavity, the encoder housing including an opening; an encoder shaft supported partially within the encoder housing and partially extending through the opening of the encoder housing, the encoder shaft being associated with the motor shaft so that the encoder shaft rotates relative to the encoder housing as the motor shaft rotates; an encoder disk secured to the encoder shaft, the encoder disk rotating with the encoder shaft, the encoder disk being within the encoder housing; at least one detector within the encoder housing, the at least one detector being situated relative to the encoder disk to detect rotary movement of the encoder disk; a seal at an interface between the encoder shaft and the encoder housing, the seal surrounding the encoder shaft, the seal being outside of the encoder housing, the seal being situated to prevent contaminants from the cavity from entering the encoder housing through the opening; and a packing inside the encoder housing between the opening and the encoder disk, the packing being situated to prevent any debris associated with rotation of the encoder shaft relative to the seal from contacting the encoder disk.

In an example embodiment having one or more features of the assembly of the previous paragraph, the packing comprises a fabric packing.

In an example embodiment having one or more features of the assembly of either of the previous paragraphs, the packing surrounds the encoder shaft and the packing is held against an inside surface of the encoder housing surrounding the opening by at least one of a flange on the encoder shaft or the encoder disk.

In an example embodiment having one or more features of the assembly of any of the previous paragraphs, the encoder disk comprises at least one plurality of reflective members in a selected pattern on one side of the encoder disk and the at least one detector detects the rotary movement of the encoder disk by detecting radiation reflected from the reflective members.

In an example embodiment having one or more features of the assembly of any of the previous paragraphs, the radiation comprises light.

In an example embodiment having one or more features of the assembly of any of the previous paragraphs, the at least one plurality of reflective members comprises a first plurality of reflective members and a second plurality of reflective members, the first plurality of reflective members are in a first pattern on the encoder disk, and the second plurality of reflective members are in a second, different pattern on the encoder disk.

In an example embodiment having one or more features of the assembly of any of the previous paragraphs, the encoder disk comprises a plurality of holes in the encoder disk.

In an example embodiment having one or more features of the assembly of any of the previous paragraphs, some of the plurality of holes are a first distance from a center of the encoder disk and others of the plurality of holes are a second, different distance from the center of the encoder disk.

In an example embodiment having one or more features of the assembly of any of the previous paragraphs, the encoder disk comprises aluminum.

In an example embodiment having one or more features of the assembly of any of the previous paragraphs, the encoder optical disk comprises reflective aluminum polyethylene terephthalate (PET) and photographic Mylar film on at least one surface of the encoder disk.

Another illustrative example embodiment of an optical encoder and motor assembly includes: a motor and brake device, the motor and brake device including a motor shaft that rotates or remains stationary based on operation of the motor and brake device; a motor and brake housing at least partially enclosing the motor and brake device, the motor and brake housing including at least one cavity aligned with the motor shaft; an encoder housing at least partially received in the at least one cavity, the encoder housing including an opening; an encoder shaft supported partially within the encoder housing and partially extending through the opening of the encoder housing, the encoder shaft being associated with the motor shaft so that the encoder shaft rotates relative to the encoder housing as the motor shaft rotates; an encoder disk secured to the encoder shaft, the encoder disk rotating with the encoder shaft, the encoder disk being within the encoder housing, the encoder disk including a plurality of holes in the encoder disk; and at least one detector within the encoder housing, the at least one detector being situated relative to the encoder disk to detect rotary movement of the encoder disk.

In an example embodiment having one or more features of the assembly of the previous paragraph, some of the plurality of holes are a first distance from a center of the encoder disk, and others of the plurality of holes are a second, different distance from the center of the encoder disk.

In an example embodiment having one or more features of the assembly of any of the previous paragraphs, the encoder disk comprises at least one plurality of reflective members in a selected pattern on one side of the encoder disk and the at least one detector detects the rotary movement of the encoder disk by detecting radiation reflected from the reflective members.

In an example embodiment having one or more features of the assembly of any of the previous paragraphs, the radiation comprises light.

In an example embodiment having one or more features of the assembly of any of the previous paragraphs, the at least one plurality of reflective members comprises a first plurality of reflective members and a second plurality of reflective members, the first plurality of reflective members are in a first pattern on the encoder disk, and the second plurality of reflective members are in a second, different pattern on the encoder disk.

In an example embodiment having one or more features of the assembly of any of the previous paragraphs, some of the plurality of holes are a first distance from a center of the encoder disk and others of the plurality of condensation reducing openings are a second, different distance from the center of the encoder disk.

In an example embodiment having one or more features of the assembly of any of the previous paragraphs, the encoder disk comprises aluminum.

In an example embodiment having one or more features of the assembly of any of the previous paragraphs, the encoder optical disk comprises reflective aluminum polyethylene terephthalate (PET) and photographic Mylar film on at least one surface of the encoder disk.

An example embodiment having one or more features of the assembly of any of the previous paragraphs includes a seal at an interface between the encoder shaft and the encoder housing, the seal surrounding the encoder shaft, the seal being outside of the encoder housing, the seal being situated to prevent contaminants from the cavity from entering the encoder housing through the opening; and a packing inside the encoder housing between the opening and the encoder disk, the packing being situated to prevent any debris associated with rotation of the encoder shaft relative to the seal from contacting the encoder disk.

In an example embodiment having one or more features of the assembly of any of the previous paragraphs, the packing comprises a fabric packing.

In an example embodiment having one or more features of the assembly of any of the previous paragraphs, the packing surrounds the encoder shaft and the packing is held against an inside surface of the encoder housing surrounding the opening by at least one of a flange on the encoder shaft or the encoder disk.

Various features and advantages will become apparent to those skilled in the art from the following description of at least one example embodiment. The drawings that accompany that description can be briefly described as follows.

DETAILED DESCRIPTION

Figure 1:
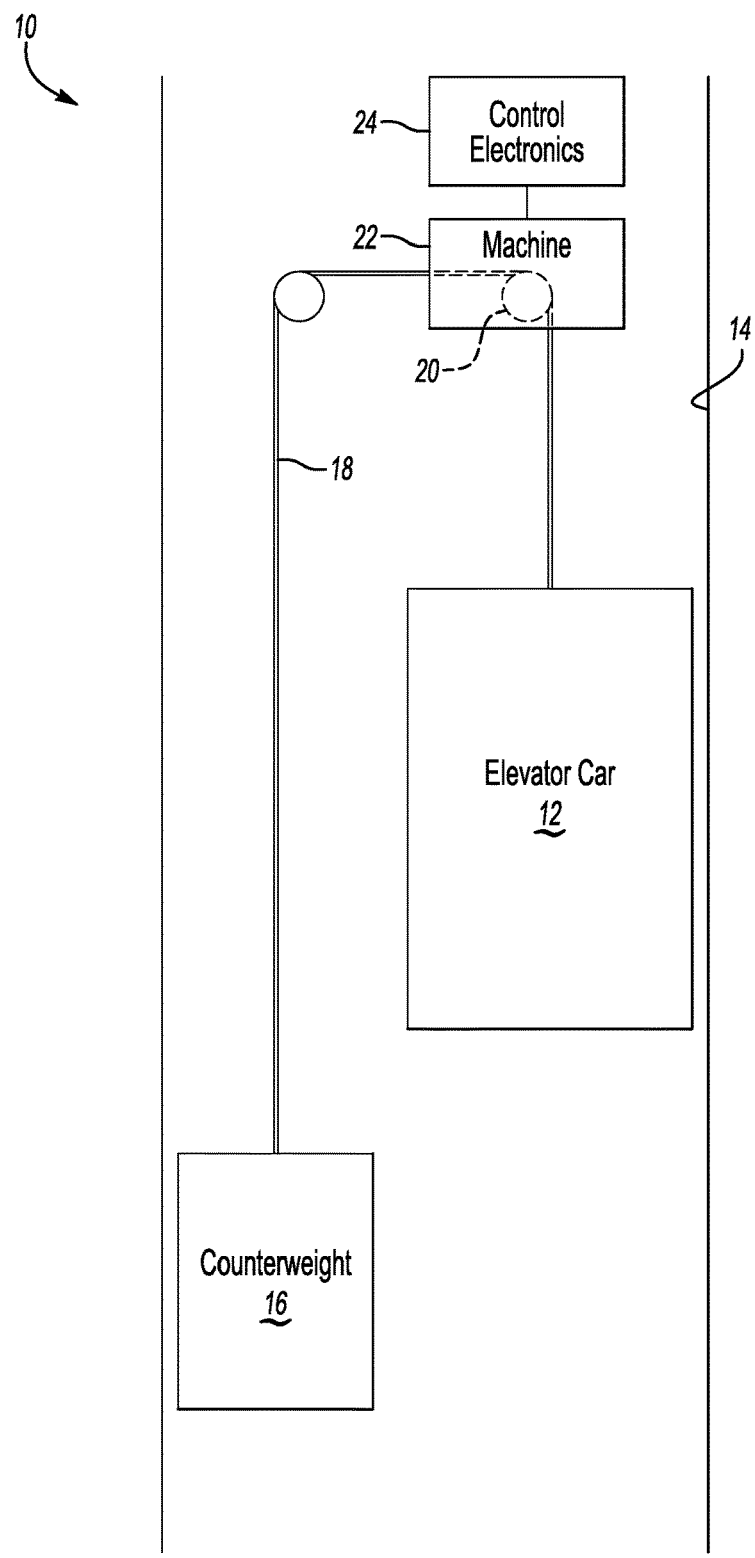
FIG. 1 schematically illustrates an elevator system including an electric motor and a reflective optical encoder, designed according to an example embodiment.

FIG. 1 schematically illustrates an example elevator system 10 including an elevator car 12 supported in a hoistway 14 in a known manner so that the elevator car is moveable between different landings. The example elevator car system 10 is a traction based system in which the elevator car 12 is coupled with a counterweight 16 by a roping arrangement 18, which may include a plurality of round steel ropes or flat belts. A traction sheave 20 causes movement of the roping arrangement 18 to cause desired movement of the elevator car 12. The traction sheave 20 rotates based on operation of a machine 22 under the control of drive electronics 24.

Figure 2:
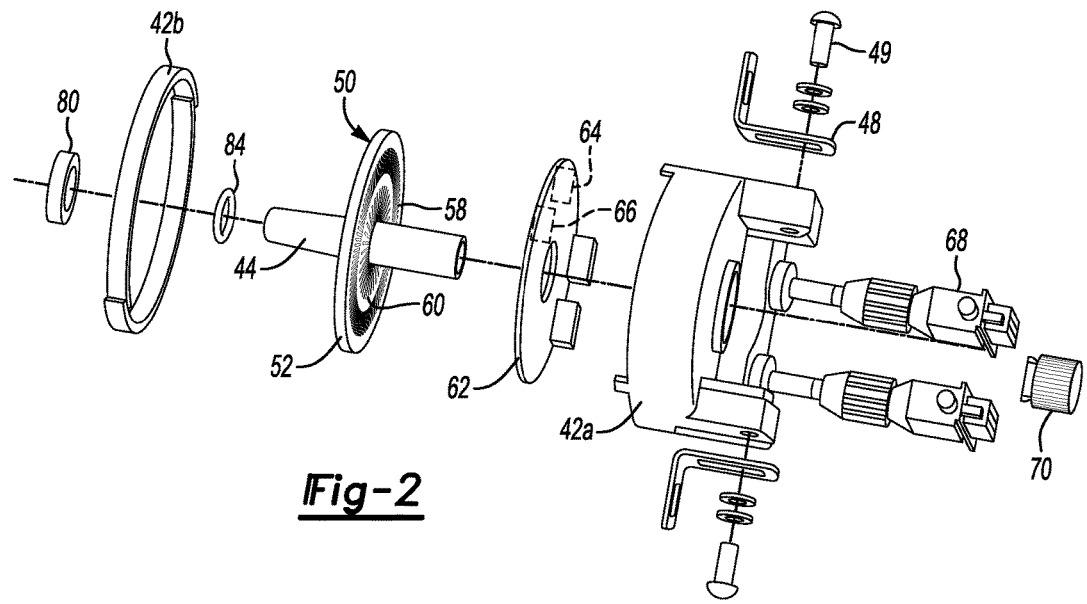
FIG. 2 is an exploded view of the example reflective optical encoder.

As shown in FIG. 2, the machine 22 includes a motor and brake assembly 30. Only selected features of the motor and brake assembly 30 are shown for discussion purposes. Elevator motor and brake assemblies are generally known and those skilled in the art who have the benefit of this description will realize how to configure a motor and brake to meet the needs of their particular situation. For example, the motor may be a gearless permanent magnet motor. The example motor and brake assembly 30 is at least partially situated within a motor and brake housing 32 that defines a cavity 34. A portion of a motor shaft 36 is situated near the cavity 34. The motor shaft 36 is associated with the traction sheave 20 in a known manner so that the motor shaft 36 and the traction sheave 20 rotate together.

Figure 3:
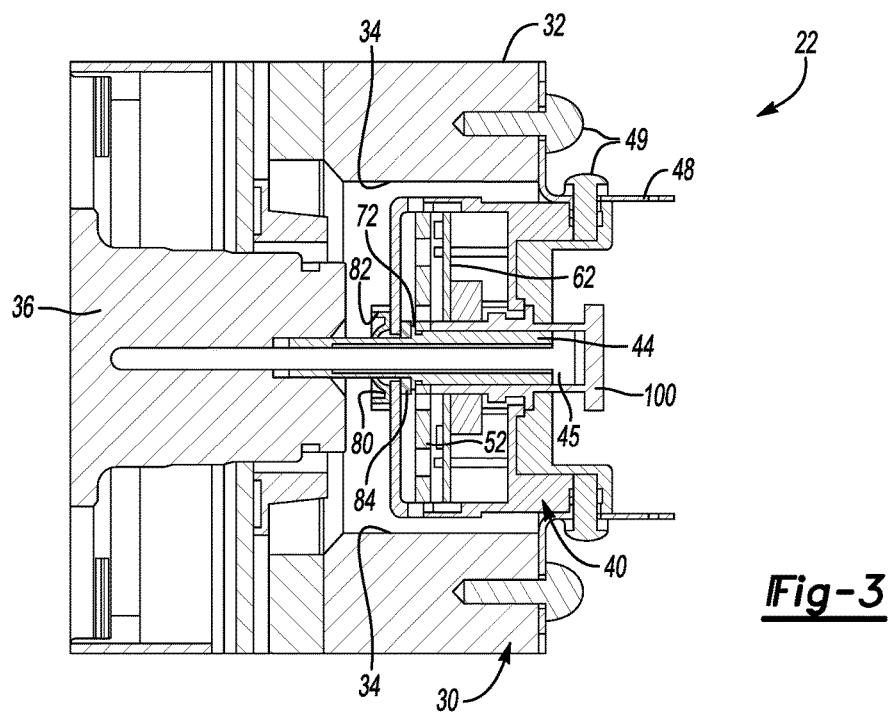
FIG. 3 is a partial cross-sectional view of an electric motor and reflective optical encoder of an example embodiment.
Figure 4:
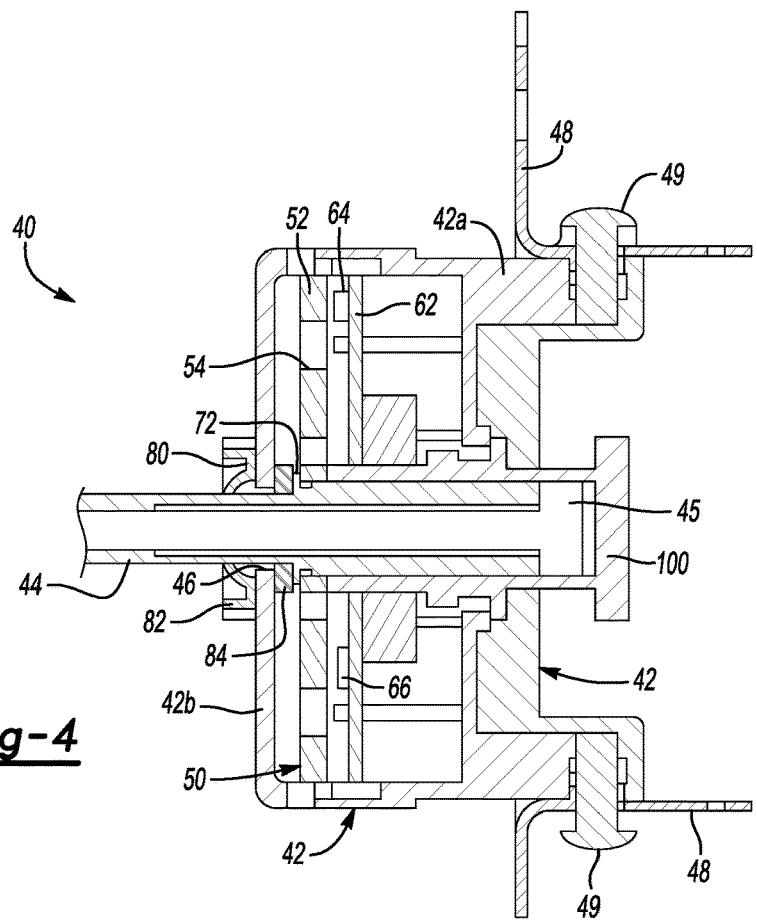
FIG. 4 is a cross-sectional side view of the example reflective optical encoder.

As shown in FIGS. 2-4, an encoder device 40 includes an encoder housing 42 that is at least partially received within the cavity 34. The encoder housing in this example has two portions 42a and 42b that are secured together. An encoder shaft 44 has a portion supported within the encoder housing 42. The encoder shaft 44 is partially received through an opening 46 in the encoder housing 42. The portion of the encoder shaft 44 that is outside of the encoder housing 42 is connected with the motor shaft 36 so that the encoder shaft 44 and the motor shaft 36 rotate together. The illustrated example includes a fastener 45 that secures the encoder shaft 44 to the motor shaft 36.

One feature of the illustrated embodiment is that the encoder housing 42 is received into the cavity 34 so that it fits within the motor and brake housing 32. Mounting brackets 48 and fasteners 49 secure the encoder housing 42 in a desired position within the cavity 34.

Figure 5:
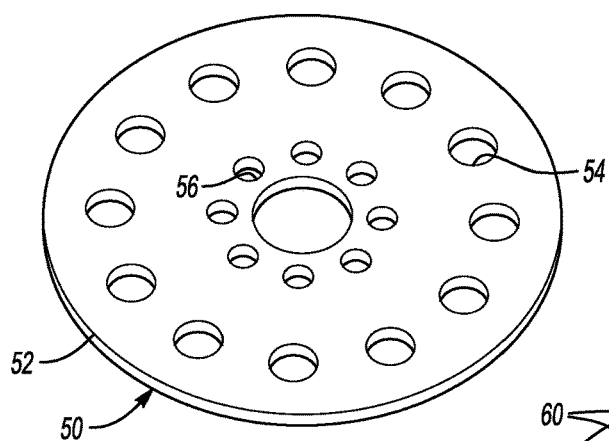
FIG. 5 illustrates selected features of an encoder disk designed according to an example embodiment.
Figure 6:
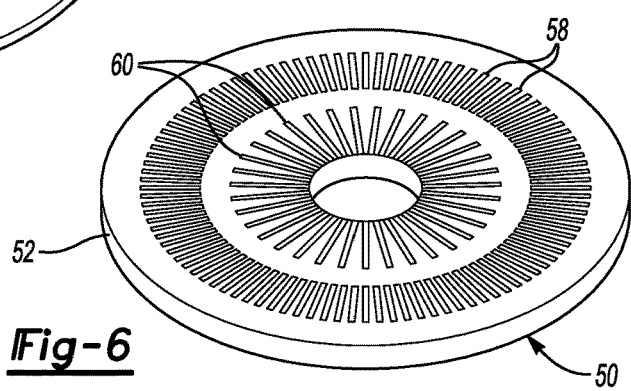
FIG. 6 illustrates other selected features of an encoder disk designed according to an example embodiment.

The encoder device 40 includes an encoder disk 50 that is supported on the encoder shaft 44 so the encoder disk 50 rotates with the encoder shaft 44 as the motor shaft 36 rotates. As shown in FIGS. 4-6, the encoder disk 50 includes a body 52, which comprises aluminum in the illustrated example. The encoder disk body 52 includes holes 54 and 56. In this example a first plurality of holes 54 are circumferentially spaced from each other at a first radial distance from a center of the disk body 52. A second plurality of holes 56 are circumferentially spaced from each other and are at a second, shorter radial distance from the center of the disk body 52. In this example the holes 54 and 56 are openings that extend through the disk body 52. Other embodiments include holes that are recesses or blind holes in the disk body 52.

The encoder disk 50 includes a first plurality of reflective members 58 that are arranged in a first pattern on one side of the disk 50. A second plurality of reflective members 60 are arranged in a second pattern. In this example, the first plurality of reflective members are at a first radial distance from the center of the encoder disk 50 and the second plurality of reflective members are at a second, smaller radial distance. The two pluralities of reflective members are useful for obtaining position and movement information for two different modes of motor operation. In an elevator system embodiment the first plurality of reflective members 58 are used during normal elevator system operation, such as providing passenger service, and the second plurality of reflective members 60 are used during a maintenance mode.

The reflective members 58 and 60 are established by placing a reflective layer of polyethylene terephthalate (PET), such as a MYLAR™ film, on one side of the disk body 52. A second film layer that is opaque and not reflective includes cut-outs corresponding to the pattern of the reflective members 58 and 60. The second film layer placed over the reflective layer establishes the illustrated patterns of the reflective members 58 and 60. In some examples, the second, non-reflective layer comprises a photographic MYLAR™ film.

The holes 54 and 56 are condensation-reducing features on the disk body 52. When the encoder device 40 is exposed to changing temperatures in the hoistway 14 (or a machine room), there is a tendency for condensation to form on the encoder disk 50. The holes 54 and 56 provide a different surface area of the disk body 52, which has the effect of reducing condensation formation. The holes 54 and 56 alter the coefficient of heat conduction between the material of the disk body 52 and the films or layers that establish the reflective members 58 and 60 compared to the coefficient of heat conduction that would exist if the encoder disk were solid without any holes. This condensation-reducing feature enhances performance and reliability of the encoder device 40 by reducing any condensation on the surface of the encoder disk 50 that includes the reflective members 58 and 60.

The encoder device 40 includes a printed circuit board 62 supporting at least one detector that interacts with the reflective members 58 and 60. The printed circuit board 62 is situated in the encoder housing 42 to remain stationary relative to the housing 42. This example includes at least one first detector 64 on the printed circuit board 62 that is configured to detect radiation reflected by the first reflective members 58. At least one second detector 66 is configured to detect radiation reflected by the second reflective members 60. In this example the detectors 64 and 66 emit radiation toward the reflective members 58 and 60, respectively, and detect radiation reflected by the reflective members. In the illustrated example, the detectors 64 and 66 radiate light toward the reflective members.

Connectors 68 facilitate making electrically conductive connections between the printed circuit board 62 and other electronics, such as the drive electronics 24. A cover or cap 70 (FIG. 2) prevents debris or contaminants from entering the encoder housing 42 and supports one end of the encoder shaft 44 in the encoder housing 42. One feature of the cover or cap 70 is that it has a cavity that supports an end of the encoder shaft 44 in the encoder housing 42 in a manner that does not require any bearings.

The illustrated example includes an adjustment tool 100 (FIGS. 3 and 4) that is useful during assembly or installation of the encoder prior to installing the cap 70. The adjustment tool 100 is received between one side of the encoder disk 50 and a flange of the encoder housing 42a and includes an adjustment feature that facilitates adjusting an axial, radial and tangential air-gap or spacing between the encoder disk 50 and the detectors 64 and 66 during installation. The adjustment tool 100 may also be used for maintenance of the encoder device 40. Once the desired axial, radial and tangential air-gap is established, the adjustment tool 100 is removed and replaced with the cap or cover 70.

The encoder device 40 includes a seal 80 that is received about the encoder shaft 44 to surround the shaft 44. A recess 82 on the housing portion 42a supports the seal 80 to seal off the interface between the encoder shaft 44 and the encoder housing 42 near the opening 46. The seal 80 reduces or eliminates any contaminant entry into the encoder housing 42. For example, the seal 80 prevents any dust, debris or moisture in the cavity 34 from entering the encoder housing 42.

The illustrated example embodiment includes a packing 84 that is situated inside the encoder housing 42. The packing 84 is a fabric packing that prevents any dust or debris, which may result from relative movement between the seal 82 and the encoder shaft 44, from contacting the encoder disk 50. The packing 84 is situated adjacent the opening 46. In this example, the packing 84 is supported on the encoder shaft 44 and received between the housing portion 42b and the flange 72 on the encoder shaft 44.

The encoder device 40 operates based on known encoder principles to provide motion and position information based on the position or movement of the encoder disk 52.

Various combinations of the features of the illustrated example embodiment are possible. For example, some embodiments may have the seal 80 and packing 84 but not include holes in the disk body 52. Other embodiments have less than all the features of the illustrated embodiment.

The preceding description is illustrative rather than limiting in nature. Various modifications to the disclosed embodiment may become apparent to those skilled in the art that do not necessarily depart from the essence of the invention. The scope of legal protection afforded to the invention can only be determined by studying the following claims.

I claim:
1. An optical encoder and motor assembly, comprising:
a motor and brake device, the motor and brake device including a motor shaft that rotates or remains stationary based on operation of the motor and brake device;
a motor and brake housing at least partially enclosing the motor and brake device, the motor and brake housing including at least one cavity aligned with the motor shaft;
an encoder housing at least partially received in the at least one cavity, the encoder housing including an opening;
an encoder shaft supported partially within the encoder housing and partially extending through the opening of the encoder housing, the encoder shaft being associated with the motor shaft so that the encoder shaft rotates relative to the encoder housing as the motor shaft rotates;
an encoder disk secured to the encoder shaft, the encoder disk rotating with the encoder shaft, the encoder disk being within the encoder housing;
at least one detector within the encoder housing, the at least one detector being situated relative to the encoder disk to detect rotary movement of the encoder disk;
a seal at an interface between the encoder shaft and the encoder housing, the seal surrounding the encoder shaft, the seal being outside of the encoder housing, the seal being situated to prevent contaminants from the cavity from entering the encoder housing through the opening; and a packing inside the encoder housing between the opening and the encoder disk, the packing being situated to prevent any debris associated with rotation of the encoder shaft relative to the seal from contacting the encoder disk.

2. The assembly of claim 1, wherein the packing comprises a fabric packing.

3. The assembly of claim 1, wherein
the packing surrounds the encoder shaft; and
the packing is held against an inside surface of the encoder housing surrounding the opening by at least one of a flange on the encoder shaft or the encoder disk.

4. The assembly of claim 1, wherein
the encoder disk comprises at least one plurality of reflective members in a selected pattern on one side of the encoder disk;
the at least one detector detects the rotary movement of the encoder disk by detecting radiation reflected from the reflective members.

5. The assembly of claim 4, wherein the radiation comprises light.

6. The assembly of claim 4, wherein
the at least one plurality of reflective members comprises a first plurality of reflective members and a second plurality of reflective members; and
the first plurality of reflective members are in a first pattern on the encoder disk; and
the second plurality of reflective members are in a second, different pattern on the encoder disk.

7. The assembly of claim 1, wherein the encoder disk comprises a plurality of holes in the encoder disk.

8. The assembly of claim 7 wherein
some of the plurality of holes are a first distance from a center of the encoder disk; and
others of the plurality of holes are a second, different distance from the center of the encoder disk.

9. The assembly of claim 1, wherein the encoder disk comprises aluminum.

10. The assembly of claim 1, wherein the encoder disk comprises reflective aluminum polyethylene terephthalate (PET) and photographic Mylar film on at least one surface of the encoder disk.

11. An optical encoder and motor assembly, comprising:
a motor and brake device, the motor and brake device including a motor shaft that rotates or remains stationary based on operation of the motor and brake device;
a motor and brake housing at least partially enclosing the motor and brake device, the motor and brake housing including at least one cavity aligned with the motor shaft;
an encoder housing at least partially received in the at least one cavity, the encoder housing including an opening;
an encoder shaft supported partially within the encoder housing and partially extending through the opening of the encoder housing, the encoder shaft being associated with the motor shaft so that the encoder shaft rotates relative to the encoder housing as the motor shaft rotates;
an encoder disk secured to the encoder shaft, the encoder disk rotating with the encoder shaft, the encoder disk being within the encoder housing, the encoder disk including a plurality of holes in the encoder disk; and
at least one detector within the encoder housing, the at least one detector being situated relative to the encoder disk to detect rotary movement of the encoder disk.

12. The assembly of claim 11, wherein
some of the plurality of holes are a first distance from a center of the encoder disk; and
others of the plurality of holes are a second, different distance from the center of the encoder disk.

13. The assembly of claim 11, wherein
the encoder disk comprises at least one plurality of reflective members in a selected pattern on one side of the encoder disk;
the at least one detector detects the rotary movement of the encoder disk by detecting radiation reflected from the reflective members.

14. The assembly of claim 13, wherein the radiation comprises light.

15. The assembly of claim 13, wherein
the at least one plurality of reflective members comprises a first plurality of reflective members and a second plurality of reflective members; and
the first plurality of reflective members are in a first pattern on the encoder disk; and the second plurality of reflective members are in a second, different pattern on the encoder disk.

16. The assembly of claim 11, wherein
some of the plurality of holes are a first distance from a center of the encoder disk; and
others of the plurality of holes are a second, different distance from the center of the encoder disk.

17. The assembly of claim 11, wherein the encoder disk comprises aluminum.

18. The assembly of claim 11, wherein the encoder disk comprises reflective aluminum polyethylene terephthalate (PET) and photographic Mylar film on at least one surface of the encoder disk.

19. The assembly of claim 11, comprising
a seal at an interface between the encoder shaft and the encoder housing, the seal surrounding the encoder shaft, the seal being outside of the encoder housing, the seal being situated to prevent contaminants from the cavity from entering the encoder housing through the opening; and
a packing inside the encoder housing between the opening and the encoder disk, the packing being situated to prevent any debris associated with rotation of the encoder shaft relative to the seal from contacting the encoder disk.

20. The assembly of claim 19, wherein the packing comprises a fabric packing.

21. The assembly of claim 19, wherein
the packing surrounds the encoder shaft; and
the packing is held against an inside surface of the encoder housing surrounding the opening by at least one of a flange on the encoder shaft or the encoder disk.

* * * * *